US012645361B1

(12) United States Patent　　　　　(10) Patent No.:　US 12,645,361 B1
　　Khazon et al.　　　　　　　　　　　(45) Date of Patent:　Jun. 2, 2026

(54) DATA REDUNDANCY FOR LATENCY SENSITIVE WRITES

(71) Applicant: VAST DATA LTD., Tel Aviv (IL)

(72) Inventors: Itay Khazon, Tel Aviv (IL); Yogev Vaknin, Tel Aviv (IL); Alon Berger, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 18/470,376

(22) Filed: Sep. 19, 2023

(51) Int. Cl.
　　 *G06F 3/06*　　　　(2006.01)
(52) U.S. Cl.
　　 CPC .......... *G06F 3/0611* (2013.01); *G06F 3/0614* (2013.01); *G06F 3/0655* (2013.01)
(58) Field of Classification Search
　　 CPC ..... G06F 3/0611; G06F 3/0614; G06F 3/0655
　　 USPC ........................................ 711/154
　　 See application file for complete search history.

(56) References Cited

U.S. PATENT DOCUMENTS

| | | | | |
|---|---|---|---|---|
| 8,239,584 B1 * | 8/2012 | Rabe | ..................... | G06F 3/0605 |
| | | | | 711/170 |
| 2005/0257083 A1 * | 11/2005 | Cousins | .................. | G06F 3/064 |
| | | | | 711/114 |
| 2012/0198152 A1 * | 8/2012 | Terry | .................. | G06F 11/1092 |
| | | | | 711/E12.001 |
| 2014/0067988 A1 * | 3/2014 | Noronha | ............... | H04L 67/568 |
| | | | | 709/213 |
| 2015/0169449 A1 * | 6/2015 | Barrell | ............... | G06F 12/0862 |
| | | | | 711/143 |
| 2017/0329720 A1 * | 11/2017 | Bedi | ...................... | G06F 12/123 |
| 2018/0107383 A1 * | 4/2018 | Galbraith | .............. | G06F 3/0659 |
| 2020/0404042 A1 * | 12/2020 | Zavadsky | ........... | H04L 65/1104 |
| 2022/0012131 A1 * | 1/2022 | Wang | .................. | G06F 11/1471 |
| 2024/0232092 A9 * | 7/2024 | Shatsky | .............. | G06F 12/0868 |

* cited by examiner

*Primary Examiner* — Prasith Thammavong
*Assistant Examiner* — Sidney Li
(74) *Attorney, Agent, or Firm* — Reches Patents

(57)　　　　　　ABSTRACT

A method for safe storage of a data portion, the method includes (a) receiving, at a storage system, the data portion; (b) selecting, based on at least a timing parameter, a redundancy scheme for safe storage of the data portion; wherein the redundancy scheme is selected out of (i) mirroring the data portion and (ii) applying a stripe based protection on the data portion, at a storage space of the storage system; and (c) safe storing the data portion by applying the selected redundancy scheme.

20 Claims, 3 Drawing Sheets

Receiving, at a storage system, the data portion. 210

Selecting, based on at least a timing parameter, a redundancy scheme for safe storage of the data portion; wherein the redundancy scheme is selected out of (i) mirroring the data portion and (ii) applying a stripe based protection on the data portion, at a storage space of the storage system. 220

Safe storing the data portion by applying the selected redundancy scheme. 230

200

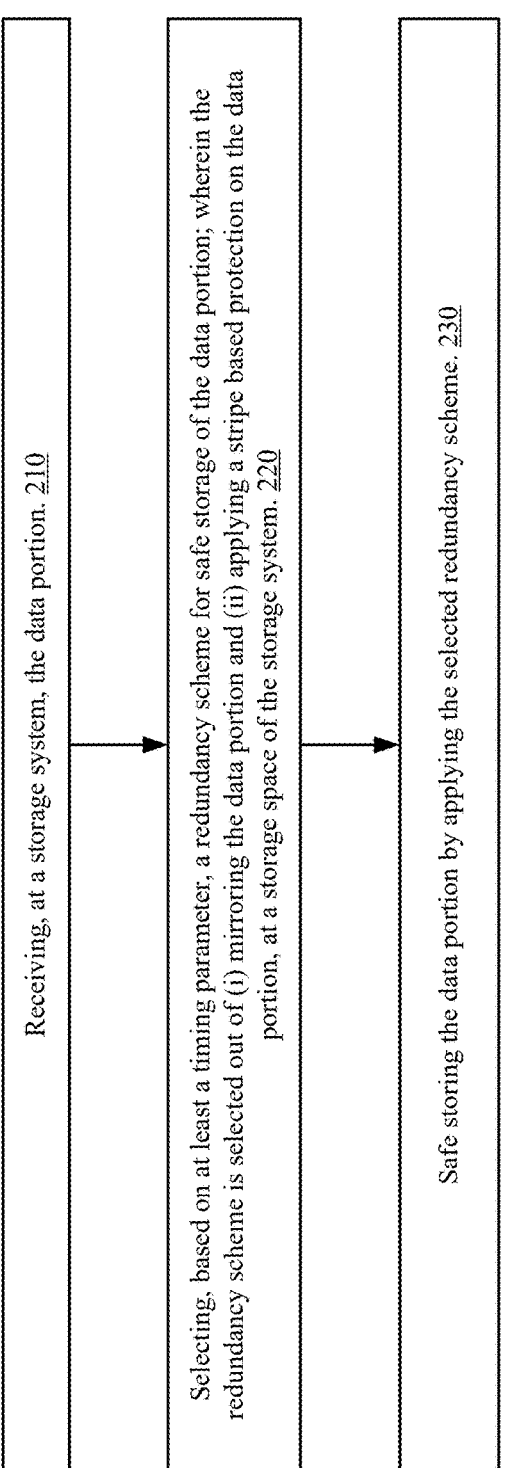

Receiving, at a storage system, the data portion. 210

Selecting, based on at least a timing parameter, a redundancy scheme for safe storage of the data portion; wherein the redundancy scheme is selected out of (i) mirroring the data portion and (ii) applying a stripe based protection on the data portion, at a storage space of the storage system. 220

Safe storing the data portion by applying the selected redundancy scheme. 230

DATA REDUNDANCY FOR LATENCY SENSITIVE WRITES

BACKGROUND

Storage systems use data redundancy schemes, such as mirroring and striping in RAID arrays (Redundant Array of Independent Disks), for improving the reliability of data storage in the storage systems. Disk mirroring duplicates data to be written, so as to obtain one or more full copies of the data to be stored at different storage devices.

Striping that involves parities, also known as RAID5 or RAID6, is more space efficient for implementing data redundancy, where data is split across multiple storage devices, where the parities can be used for restoring lost data.

Latency is the time that takes to complete a user request, e.g., a write request, and to acknowledge the safe writing of user data to the storage system. It is expected that the acknowledgement confirms a safe write that involves redundancy of the written data.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

FIG. 2 is an example of a method; and

DETAILED DESCRIPTION OF THE DRAWINGS

Figure 1:
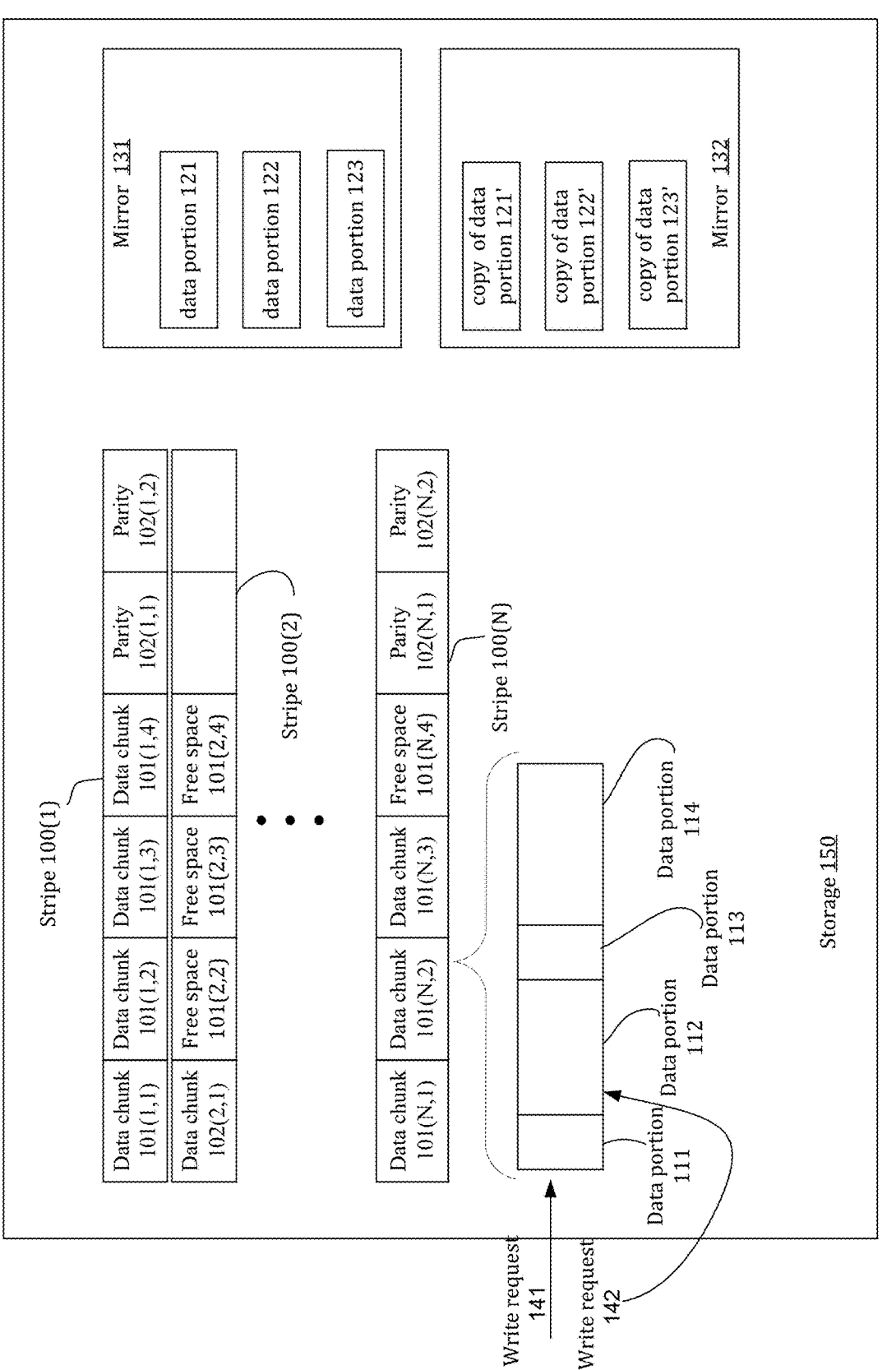
FIG. 1 is an example of redundancy schemes.

A storage system receives write requests from users for writing data to be stored in the storage system. Handling these write requests should consider latencies experienced by the users in response to the requests, and therefore the response should be provided with minimal delays or no more than a certain delay threshold or may need to conform to guaranteed delays. The latency is measured as the time from the reception of the write request until sending a response, e.g., an acknowledgment for confirming a safe storing, that is sent back to the user. The safe storing of the written data refers to redundant storage of the data, that enables restoring the data in a case of a failure.

In addition to low latencies, handling the write requests should guarantee a safe storage of the data associated with the write requests. Therefore, the data may be accommodated in temporary storage, which is faster than permanent storage (where the data will eventually be stored), and may use one of at least two redundancy techniques. A first redundancy technique is mirroring, where two copies of the data are written to at least two different storage devices that are of different failure domains, thereby providing a primary and a secondary copy of the written data, before being acknowledged to the user.

However, writing two copies of the data consumes storage and time resources. Therefore, it is preferred to use a more efficient redundancy scheme, such as a RAID scheme of a higher level, while restricting the latency that is caused by filling up the stripes with incoming data, and the need to rely on the rate of incoming write requests. The incoming data is arranged into stripes, where each stripe includes multiple chunks of data and one or more parity chunks that include a result of a formula applied on the multiple data chunks.

The storage system manages stripes for accommodating data of incoming write requests, where each stripe, and even each data chunk of the stripe, may accumulate data related to different write requests and different users. A stripe is considered as a pending (or open) stripe while it is open for accommodating new incoming data, and is considered as a closed stripe when new data is stopped from being written into the stripe, and the one or more parities are calculated for the accumulated data.

Since the stripe accumulates incoming data—which is a foreground process, rather than a stripe that is built from data that is already stored in the storage system—which is usually performed as a background process, there is a delay in responding to the users that sent the data, that is caused by the need to wait for data to enter the storage system and be accommodated into the pending stripe. Only after the stripe is closed, responses are sent to the users, whose data is written in the stripe, to acknowledge the storing of the data.

Upon receiving new data of an incoming write request, the latency that will be caused by storing the data in a pending stripe is examined. If it is determined that the latency estimated to be caused by storing the data in the pending stripe is above the required or desired latency (e.g., above 32 microseconds, above 320 microseconds), then the mirroring technique is used for the new data, instead of striping, and the response for the storing is sent to the user immediately after saving two copies, without needing to wait for additional data to enter the system.

The latency estimation may include the estimated time for closing the stripe, which may depend on the amount of free space in the pending stripe and the current write bandwidth of data entering the storage system (e.g., the size of data entering the system per time unit) or an estimated bandwidth expected to enter the system in the next time window (which may be short as few hundreds of microseconds), based on historic bandwidth monitoring. Given the free space in the pending stripe and the expected write bandwidth, the time it takes for filling up the free space of the stripe can be calculated. The write bandwidth may be constantly monitored by the storage system and calculated for a time window that precedes the current time, or estimated for a time window that follows the current time.

The required latency (or the maximum allowed latency) may depend on the size of the written data and/or the QoS (Quality Of Service) assigned to the user that sent the write request for writing the data. A maximum guaranteed latency may be defined in an SLA (Service Level Agreement) assigned to the user, or may be defined according to the level of the QoS assigned to the user, wherein a high QoS is assigned with a lower maximum latency (e.g., 100 microseconds) compared to the maximum latency assigned to QoS of a lower level (e.g., 400 microseconds). The required latency may be additionally (or alternatively) defined according to the size of the written data, for example, small sized data (e.g., few bytes, no more than few hundreds of bytes, up to 1K byte, etc.) may be associated with lower maximum allowed latency compared to maximum allowed latency assigned to large sized data, since it may be expected that small sized data will be written faster. Each size range of written data may be assigned with different maximum allowed latency. For example, for data that is smaller than 1 kilobyte, the maximum latency may be set to tens of microseconds (e.g., 32 microseconds), while for a data above 32 kilobyte, the maximum latency may be set to hundreds of microseconds (e.g., 320 microseconds). Any size between 1 KB and 32 KB may be associated with values of maximum latencies between e.g., 32 and 320 microseconds.

When the write bandwidth of incoming data is very low, e.g., below a certain bandwidth level, it may be determined to store all the incoming data, or certain types of incoming data, using the mirroring scheme, without checking each data portion for the required latency. A very low bandwidth is a bandwidth that does not allow filling up a stripe within an acceptable latency (of e.g., few hundreds of microseconds). Such a low bandwidth may be below a few bytes per second (e.g., below 1 KB, 10 KB, etc.).

There is further a need to determine when to close a pending stripe, even if the stripe is not full. This may happen when there is a drop in the bandwidth of data entering the storage system. According to an embodiment, upon writing a first data portion to a new pending stripe, the stripe closing time is set to the time when the first data portion is written plus a maximum pending time that is allowed for a stripe to be pending before being closed, where the maximum pending time is derived from the maximum allowed latency for any written data. When the system clock exceeds the stripe closing time, the pending stripe is closed, i.e., the free space left is padded, e.g., with zeros, and the parity chunks are calculated. Then—a response can be sent to the users that sent write requests for writing the data portions in the stripe.

According to another embodiment, for each data portion written into the stripe, in response to a write request, the pending time lapse of the data portion may be assigned to indicate when the stripe that hosts the data portion should be closed on or before this time (and a response should be sent to the user). The pending time lapse is based on the data size and/or the maximum allowed latency that is derived from the QoS or SLA assigned to the user. The pending time lapse of the data portion may be calculated as the reception time of the data portion plus the maximum pending time (which is derived from the maximum allowed latency associated with the data portion). The stripe may be associated with a stripe closing time, which is the minimum among all the values of pending time lapse of all the data portions in the pending stripe. When the stripe closing time exceeds the current system time—the stripe is closed, and the users that wrote the data portions in the stripe are acknowledged.

FIG. 1 illustrates a storage space 150, that is composed of one or more storage devices (not shown), which may be fast accessed storage devices, such as RAM (Random Access Memory), NVRAM (Non-Volatile RAM), etc. Storage space 150 serves as the first stop of data entering the system, and may be a temporary storage that accommodates the incoming data until it is stored in a permanent storage. Since storage space 150 serves as the first stop of new incoming data, it influences the latency experienced by the users that sent the write requests, since responses to write requests are sent only after the data is safely stored, by using one of the redundancy schemes.

Part of storage space 150 is used for storing stripes according to a RAID scheme (e.g., RAID 5, 6, or other type of striping that includes data and parity chunks), such as stripes 100(1)-100(N). The stripes may include close stripes, such as stripe 100(1)—that is no longer being written with new data, and for which parities were already calculated, such as parities 102(1,1), 102(1,2). The write requests associated with data portions stored in the closed stripes were responded by acknowledging the users that sent the write requests. The stripes further include pending (open) stripes, such as stripe 100(2) that includes empty chunks with free space 101(2,2)-101(2,4) that are ready for accommodating new data. No parities were yet calculated for stripe 100(2). The write requests associated with data portions that are stored in the pending stripes, were not yet responded, and the users that sent the write requests are still waiting for responses, because the data is not yet considered as safely stored. A closed stripe is preferably full with data, such as stripe 100(1), where all the chunks include data portions, such as data chunks 101(1,1)-101(1,4). However, since the data written into the chunks is not of a fixed size, and since a stripe is needed to be closed according to latency requirements—closed stripes may have one or more chunks that are empty or partially empty, such as in stripe 100(N), where data chunk (N,4) is empty and there are only three non-empty (full or partially full) data chunks 101(N,1)-101(N,3). The parities 102(N,1) and 101(N,2) have been produced, and responses to corresponding write requests have been sent.

FIG. 1 further focuses on an example of a data chunk 101(N,2) of stripe 100(N), that accumulates data portions 111-114, from various write requests, e.g., write request 141 that triggered the writing of data portion 111 and write request 142 that triggered the writing of data portion 112. The data portions within a stripe and even within a chunk may have different sizes, and may be written by different users associated with different latency requirements. Each data portion in an open stripe may be associated with a different pending time lapse, and the minimum value among different values of pending time lapse may dictate the time of closing the stripe.

The chunks within the stripes of FIG. 1 are illustrated as being adjacent to each other, only for the sake of the illustration, were actually each chunk within a stripe is stored in a different storage device of storage space 150.

Another part of storage space 150 is used for storing mirrored written data. Mirror 131 is a space within one storage device of storage space 150, and mirror 132 is a space within another storage device of storage space 150. Copies of data portions 121'-123' are duplicates of data portions 121-123.

FIG. 2 illustrates an example of method 200 for safe storage of a data portion.

According to an embodiment, method 200 starts by step 210 of receiving, at a storage system, the data portion. The data portion may be part of a write request received from a user of the storage system, or may be otherwise associated with the write request (e.g., pointed by the write request).

According to an embodiment, step 210 is followed by step 220 of selecting, based on at least a timing parameter, a redundancy scheme for safe storage of the data portion; wherein the redundancy scheme is selected out of (i) mirroring the data portion and (ii) applying a stripe based protection on the data portion, at a storage space of the storage system. The stripe based protection refers to arranging data in stripes that includes data chunks and parity chunks. The applying of the stripe based protection on the data portion may include adding the data portion to a data chunk of an open stripe. The open stripe may include multiple data portions received from multiple users, as part of write requests received by the storage system from the users.

According to an embodiment, step 220 is followed by step 230 of safely storing the data portion by applying the selected redundancy scheme.

According to an embodiment, a completion of the safe storing triggers a sending of a safe storing acknowledge—that indicates that the data portion is safely stored.

From the point of view of the storage system, the latency related to a user associated with the data portion can be measured from the time of receiving the data potion by the storage system till the completion of the safe storing.

According to an embodiment, step 230 is based on:

a. A striping time period required to close a pending stripe destined to receive the data portion when applying the stripe based protection.

b. A latency constraint associated with the data portion.

According to an embodiment, step 230 includes:

a. Determining a relationship between the striping time period and a latency constraint associated with the data portion.

b. Selecting to mirror the data portion when the striping time period does not conform with the latency constraint associated with the data portion. For example—when the striping time period exceeds a maximal allowed latency. Otherwise—it may be preferred to apply the stripe based protection.

The striping time period may be the time period that ends at the stripe closing time (that may indicate a future value of the system clock when the stripe needs to be closed) and may be determined using one of more of the following:

a. Evaluating a bandwidth of received data portions, and determining the striping time period based on (a) the bandwidth, and (b) an amount of data required for closing the pending stripe. This evaluation may be based on values of the bandwidth over a period of time, e.g., historic values of bandwidth within a period of time that preceded the time of evaluating, or expected bandwidth within a next period of time that follows the time of evaluating, based on historic values.

b. Determining one or more latency constraints associated with one or more of the data portions out of multiple data portions stored in the pending stripe and originate from multiple users. For example—the data portion associated with the shortest latency may determine the striping time period. A latency constraint associated with a user may be based on the quality of service (QoS) associated with a user and/or with the size of the data portion, and the like.

According to another embodiment, the selected redundancy scheme may be mirroring, without determining a relationship between the striping time period and the latency constraint associated with the data portion—when the bandwidth of received data portions is below a certain bandwidth threshold, e.g., below 1 KB, 10 KB, 100 KB per second. When the bandwidth is low, i.e., below a certain bandwidth threshold, it is expected that filling up stripes is too slow for conforming with most latency constraints, or with an average latency constraint. The bandwidth threshold may depend on the number of concurrent pending stripes, number of compute cores that handle the concurrent pending stripes, etc.

It should be noted that the striping time period may be shortened by determining to close the pending stripe before the pending stripe is full. This determination may be based on latency constraints associated with data portions stored in the pending stripe. For example—this determination may be based on one or more latency constraints associated with one or more users of the multiple users. There may be provided any tradeoff between storage efficiency and/or error protection effectiveness—which may require to fill the stripe as much as possible—and the need to close the stripe as soon as possible—in order to fulfill the latency constraint.

The latency constraint associated with the data portion may be determined using one of more of the following:

a. Determining the latency constraint based on size of the data portion. Smaller data portions will usually be associated with stricter latency constraints indicating shorter latency values.

b. Determining the latency constraint based on a quality of service (QoS) associated with a user associated with the data portion. Higher QoS will be usually associated with stricter latency constraints indicating shorter latency values.

Figure 3:
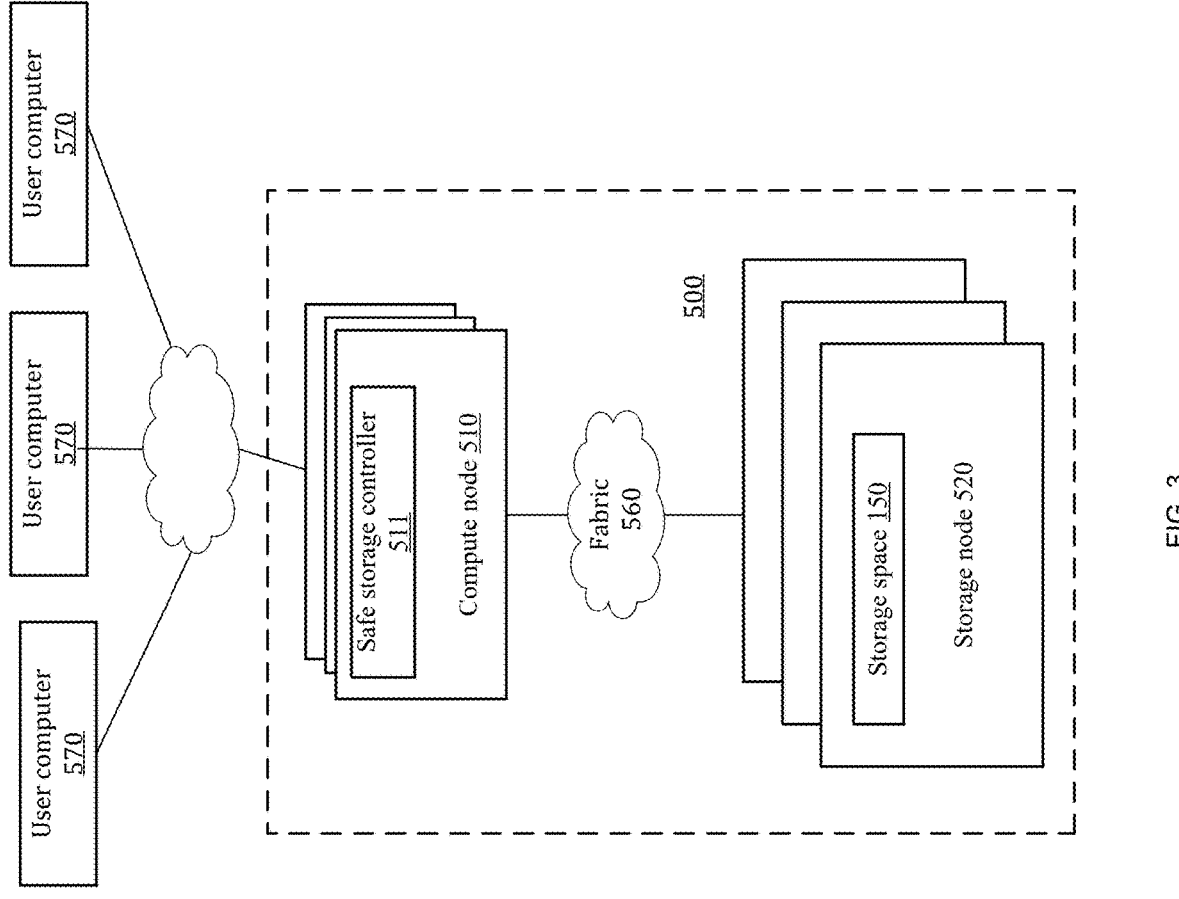
FIG. 3 is an example of a storage system.

FIG. 3 illustrates an example of a storage system 500. The storage system 500 includes one or more compute nodes 510. One or more compute nodes 510 include a safe storage controller 511 that is configured to execute method 200 and/or to control an execution of safe storage. The safe storage controller is a hardware controller that can include a processing circuitry, integrated circuitry, a part of processing circuitry, and the like. The processing/integrated circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

The storage system 500 also includes one or more storage nodes 520, wherein each storage node includes storage devices for storing data, The storage devices may be Solid State Drives (SSDs), NVRAM (non-volatile random-access memory) devices, etc. The storage devices and particularly the NVRAM, may compose or include storage space 150.

The computer nodes 510 and the storage nodes 520 are connected through a communication fabric 560 for accessing stored data.

The compute nodes are connected to one or more user computers 570 that may access the storage system and sends write requests that include data portions to be safely stored.

Any reference to "may be" should also refer to "may not be".

In the foregoing detailed description, numerous specific details are set forth in order to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system and any other component should be applied mutatis mutandis to a method that may be executed by a system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for safe storage of a data portion, the method comprising:

receiving, at a storage system, the data portion;

executing by one or more processing circuitries of the storage system, based on at least a timing parameter, a redundancy scheme for safe storage of the data portion; wherein the redundancy scheme is selected out of (i) mirroring the data portion and (ii) applying a stripe based protection for adding the data portion to a pending stripe, at a storage space of the storage system;

safely storing the data portion by applying the selected redundancy scheme;

wherein the pending stripe stores multiple data portions associated with multiple values of pending time lapse, and wherein each of the multiple data portions was associated, upon reception, with a value of pending time lapse that is based at least on a size of the data portion; and determining whether to close the pending stripe, when the pending stripe is not full, based on a stripe closing time of the pending stripe, wherein the stripe closing time is based on the multiple values of pending time lapse.

2. The method according to claim 1, comprising estimating a striping time period required to close a pending stripe destined to receive the data portion when applying of the stripe based protection; wherein the timing parameter is a relationship between the striping time period and a latency constraint associated with the data portion.

3. The method according to claim 2, comprising selecting to mirror the data portion when the striping time period does not conform with the latency constraint associated with the data portion.

4. The method according to claim 2, comprising evaluating a bandwidth of received data portions, and determining the striping time period based on (a) the bandwidth, and (b) an amount of data required for closing the pending stripe.

5. The method according to claim 4, wherein the evaluating of the bandwidth is based on values of the bandwidth over a period of time.

6. The method according to claim 2, comprising determining the latency constraint associated with the data portion.

7. The method according to claim 6, wherein the determining of the latency constraint is based on a size of the data portion.

8. The method according to claim 6, wherein the determining of the latency constraint is based on a quality of service associated with a user associated with the data portion.

9. The method according to claim 2, wherein the pending stripe stores data portions from multiple users, wherein the estimating of the striping time period is further based on one or more latency constraints associated with one or more of the data portions.

10. The method according to claim 9, wherein the one or more latency constraints are based on quality of service definitions associated with the one or more of the multiple users.

11. The method according to claim 9, wherein the one or more latency constraints are based on one or more sizes associated with the data portions.

12. The method according to claim 2, comprising closing the pending stripe before the pending stripe is full.

13. The method according to claim 12, wherein the determining of whether to close is based on latency constraints associated with data portions stored in the pending stripe.

14. The method according to claim 12, wherein the pending stripe stores data portions from multiple users, wherein the determining of whether to close is based on one or more latency constraints associated with one or more users of the multiple users.

15. A non-transitory computer readable medium for safe storage of a data portion, the non-transitory computer readable medium stores instructions for:

receiving, at a storage system, the data portion;

executing by one or more processing circuitries of the storage system, based on at least a timing parameter, a redundancy scheme for safe storage of the data portion; wherein the redundancy scheme is selected out of (i) mirroring the data portion and (ii) applying a stripe based protection for adding the data portion to a pending stripe, at a storage space of the storage system;

safely storing the data portion by applying the selected redundancy scheme;

wherein the pending stripe stores multiple data portions associated with multiple values of pending time lapse, and wherein each of the multiple data portions was associated, upon reception, with a value of pending time lapse that is based at least on a size of the data portion; and determining whether to close the pending stripe, when the pending stripe is not full, based on a stripe closing time of the pending stripe, wherein the stripe closing time is based on the multiple values of pending time lapse.

16. The non-transitory computer readable medium according to claim 15, that stores instructions for estimating a striping time period required to close a pending stripe destined to receive the data portion during the applying of the stripe based protection; wherein the timing parameter is a relationship between the striping time period and a latency constraint associated with the data portion.

17. The non-transitory computer readable medium according to claim 16, that stores instructions for selecting to mirror the data portion when the striping time period does not conform with the latency constraint associated with the data portion.

18. The non-transitory computer readable medium according to claim 16, that stores instructions for evaluating a bandwidth of received data portions, and determining the striping time period based on (a) the bandwidth, and (b) an amount of data required for closing the pending stripe.

19. The non-transitory computer readable medium according to claim 16, wherein the pending stripe stores data portions from multiple users, wherein the estimating of the striping time period is further based on one or more latency constraints associated with one or more of the data portions.

20. The non-transitory computer readable medium according to claim 16, that stores instructions for closing the pending stripe before the pending stripe is full.

* * * * *